(12) United States Patent
Todd

(10) Patent No.: US 8,376,451 B2
(45) Date of Patent: Feb. 19, 2013

(54) AUTOMOTIVE COLLISION ENERGY DISSIPATION DEVICE

(76) Inventor: Ralph Todd, Simi Valley, CA (US)

( * ) Notice: Subject to any disclaimer, the term of this patent is extended or adjusted under 35 U.S.C. 154(b) by 0 days.

(21) Appl. No.: 12/861,071

(22) Filed: Aug. 23, 2010

(65) Prior Publication Data

US 2012/0043783 A1    Feb. 23, 2012

(51) Int. Cl.
*B60J 7/00* (2006.01)
(52) U.S. Cl. .......... 296/187.03; 296/187.02; 296/187.06
(58) Field of Classification Search ............. 296/187.02, 296/187.03, 187.04, 187.06
See application file for complete search history.

(56) References Cited

U.S. PATENT DOCUMENTS

| | | | |
|---|---|---|---|
| 2,236,507 A | 4/1941 | Kreitz | |
| 3,695,665 A | 10/1972 | Matsuura | |
| 3,837,695 A | 9/1974 | Haase et al. | |
| 5,042,859 A | 8/1991 | Zhang et al. | |
| 5,106,137 A | 4/1992 | Curtis | |
| 5,515,939 A * | 5/1996 | Korall et al. | 180/283 |
| 5,662,355 A * | 9/1997 | Byon | 280/743.1 |
| 5,700,050 A | 12/1997 | Gonas | |
| 5,810,427 A * | 9/1998 | Hartmann et al. | 296/187.03 |
| 5,868,422 A | 2/1999 | Galbraith et al. | |
| 6,341,813 B1 | 1/2002 | Taghaddos | |
| 6,375,251 B1 | 4/2002 | Taghaddos | |
| 6,702,513 B1 | 3/2004 | Raupach | |
| 7,441,832 B2 * | 10/2008 | Ratajski et al. | 296/212 |
| 7,533,627 B2 | 5/2009 | Wooldridge | |
| 2005/0248184 A1 | 11/2005 | Piffaretti | |
| 2008/0067821 A1 | 3/2008 | Mraz | |
| 2009/0178597 A1 * | 7/2009 | Sliwa, Jr. | 109/49.5 |

* cited by examiner

*Primary Examiner* — Joseph Pape
(74) *Attorney, Agent, or Firm* — Kelly & Kelley, LLP

(57) ABSTRACT

An automotive energy dissipation device includes a bladder disposed adjacent to an interior surface of a body panel of an automobile. A protective liner is disposed between the bladder and the body panel. A valve for inflating the bladder is associated with the bladder. Additionally, a pressure relief valve is associated with the bladder. The automotive energy dissipation device functions when pressure within the bladder exceeding a preset limit attributable to compression during an impact is released through the pressure relief valve. As air exits the pressure relief valve it dissipates energy. This in turn reduces the damage and severity of a crash thereby better protecting the occupants from injury.

20 Claims, 6 Drawing Sheets

AUTOMOTIVE COLLISION ENERGY DISSIPATION DEVICE

FIELD OF INVENTION

The present invention generally relates to automotive safety. More particularly, the present invention relates to an automotive energy dissipation device.

BACKGROUND OF THE INVENTION

Automotive safety has been a major concern in the automotive industry for decades, and will continue to be so. Many safety features have been developed to reduce the impact loads on the passengers sitting within the vehicle. For example, exterior parts on vehicles such as bumpers and energy absorbing panels help reduce and distribute impact loads. Crushable impact zones are where sheet metal structures bend and deform thereby absorbing energy in the process. Seat belts have been developed to hold the passenger within the seat and prevent the passenger from impacting the inside cabin of the vehicle. In recent times, airbags have become standard on most vehicles sold. Airbags automatically and instantaneously inflate during an impact such that it provides a cushion between the passenger and the interior of the cabin. Airbags originally were designed to inflate from the steering wheel protecting just the driver. Now airbags are inflated from the side windows, in front of the passenger seat, and even about the knees. Other safety measures are not so obvious. For instance, much of the interior of the vehicle can be padded with foams or soft plastics. Sometimes an aesthetically pleasing surface of an interior panel is backed by energy absorbing foam. Collapsible steering columns prevent the steering column from penetrating into the cabin and causing further injury. Glass is no longer a single piece, but rather two glass or plastic sections sandwiched about a common plastic liner. Upon impact the plastic liner gives while retaining the shards of glass from becoming dangerous projectiles. Overall, safety is a major concern in the automotive industry.

Generally speaking, safety measures can be divided into either active safety devices or passive safety devices. Because no action by the vehicle occupant is required to activate or use an airbag, it is considered a passive safety device. This is in contrast to seat belts, which are considered active safety devices because typically the vehicle occupant must act to enable them. Terminological confusion can arise from the fact that passive safety devices and systems, those requiring no input or action by the vehicle occupant, can themselves operate in an active manner; an airbag is one such device. Vehicle safety professionals are generally careful in their use of language to avoid this sort of confusion, though advertising principles sometimes prevent such syntactic caution in the consumer marketing of safety features. Nonetheless, it is desired when designing a new safety feature that it is to be passive. This prevents the driver or passengers from failing to activate a particular safety device.

Airbags and airbag system design have evolved significantly over the many years since their introduction to motor vehicles. In the beginning stages of airbag development, controlling the rapid inflation of the cloth bag itself was quite challenging. The airbag was designed for the 95 percentile human being, and many times the mere inflation of the airbag striking a child or a person of small size was a real danger. Sensors in the seat can weigh the occupant and determine whether inflation of the airbag would be beneficial or detrimental. Finding a perfect choice of the airbag material itself was quite challenging. Despite various considerations of material options for the cushion material, nylon 6-6 remains the material of choice. While airbags are meant to protect the occupants, it is extremely challenging to design them to be perfect.

For airbags to perform their protective function, each component within the system must demonstrate reliability and predictability. The key function of the airbag cushion is to contain a hot and high pressure gas mixture allowing a safe and efficient deceleration of the vehicle occupant during the rapid deceleration of the vehicle in a collision. Elastic fiber deformation and controlled hot gas flow through the fabric controlled by the structural elements of the cushion, such as the seam or vents, are the principal mechanisms that provide this function. In addition to the demanding functionality, the systems are constrained further as the airbag cushions are designed to be stored in steering wheels, under instrument panels or inside the roof rails with replacement periods of up to 15 years.

In spite of severe design challenges, the bottom line is that airbags save lives. The US National Highway Transportation Safety Authority (NHTSA) and Insurance Institute for Highway Safety (IIHS) have been collecting data comparing airbag and non-airbag equipped vehicles involved in traffic incidents for a number of years. These data have demonstrated that almost 10,000 potential fatalities have been prevented in the US alone since 1985. The number of lives saved has increased year by year as the fitment of first driver, then passenger and now head and side airbags has risen. Aside from saving lives, the airbag has also led to a new market in automotive safety representing $4 billion annually with continued double-digit annual growth expected through the next decade. Significant future growth in airbag usage will come from a number of areas. Side impact and rollover protection are increasing in importance in North America. The Asia Pacific market is expanding rapidly in China and Korea, while side impact protection continues to increase in importance in japan. In Europe there is clear evidence that enhanced safety sells automobiles, and even mid-range priced automobiles can be equipped with nine airbags as standard. There is also survey evidence supporting this fact on a more global level, with a number of consumer reviews ranking safety above price, performance and fuel economy as the most important consideration of car buyers.

The evolution in demand for airbag systems has been accompanied by significant technical development. The key driver for this development is maximizing the protection of vehicle occupants and thus reducing potential risk of injury. The global influencing factor in the foreground of these developments has been competitive pressure to enhance vehicle safety as measured in crash test series such as the NHTSA New Car Assessment Program NCAP, and the European equivalent EuroNCAP. Locally, in North America, changes in the Federal Motor Vehicle Safety Standard have mandated improvements, while changes in product liability legislation in North America and Europe have driven manufacturers into more cautious behavior in relation to systems design and materials specification.

Many considerations must be taken into account when designing safer vehicles. One design strategy is to the make the vehicle larger and heavier and therefore decreases the chance of it collapsing to some extent during an impact. However, heavier vehicles are more dangerous to other vehicles that aren't as heavy. Furthermore, heavier vehicles require more fuel to travel the same distance. In today's desire of ultra-efficiency fuel mileage, weight and safety considerations are hard to reconcile.

Accordingly, there is a need for an additional safety device that is passive, in that it doesn't require the occupants to activate it. Also, there is a need for the additional safety device to be light in terms of weight, such that it doesn't negatively affect fuel consumption or the design of the vehicle. Furthermore, there is a need for the additional safety device to be simple in operation and not have its own negative side effects or problems. The present invention fulfills these needs and provides other related advantages.

SUMMARY OF THE INVENTION

The automotive energy dissipation device includes a bladder disposed adjacent to an interior surface of a body panel of an automobile. A protective liner is disposed between the bladder and the body panel. A valve for inflating the bladder is associated with the bladder. Additionally, a pressure relief valve is associated with the bladder. The automotive energy dissipation device functions when pressure within the bladder exceeding a preset limit attributable to compression during an impact is released through the pressure relief valve. As air exits the pressure relief valve it dissipates energy. This in turn reduces the damage and severity of a crash thereby better protecting the occupants from injury.

The protective liner comprises a resiliently flexible and rupture resistant plastic. The protective liner can be manufactured in a multitude of ways, one of which is the blow molding process. The bladder and protective liner are substantially similarly shaped. Furthermore, the bladder and protective liner can substantially match the interior contours of the body panel. A surrogate body panel can be made such that it resembles a real body panel. The surrogate body panel can then be used as a mold for the blow molding process. This process facilitates creating a variety of differently shaped and sized protective liners.

In an exemplary embodiment of the automotive energy dissipation device, the bladder further contains a fluid foam. The foam can be a multitude of types, wherein one such type is a fire retardant substance. Furthermore, an outlet of the pressure relief valve can be directed to disperse the foam in the general area of a likelihood of a potential fire resulting from the impact.

In another exemplary embodiment of the automotive energy dissipation device, a pressure sensor is in pressurized communication with the bladder. The pressure sensor indicates a low pressure reading to occupants of the automobile through a display and/or noise within the automobile.

The bladder can be made from a multitude of materials and manufacturing techniques. For instance, the bladder can comprise a resiliently woven fabric layer and an air impermeable, flexible layer. The fabric may comprise nylon 6-6. Alternatively, the bladder can comprise a resiliently woven fabric layer impregnated with an air impermeable material. In either case, the bladder is air impermeable and permanently inflated upon installation such that any substantial air loss from the bladder only occurs during a collision. Also, the valve for inflating the bladder should remain accessible for maintenance inflating. This way the occupants can be notified of a low pressure signal and simply pressurize the bladder to its proper operating pressure.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
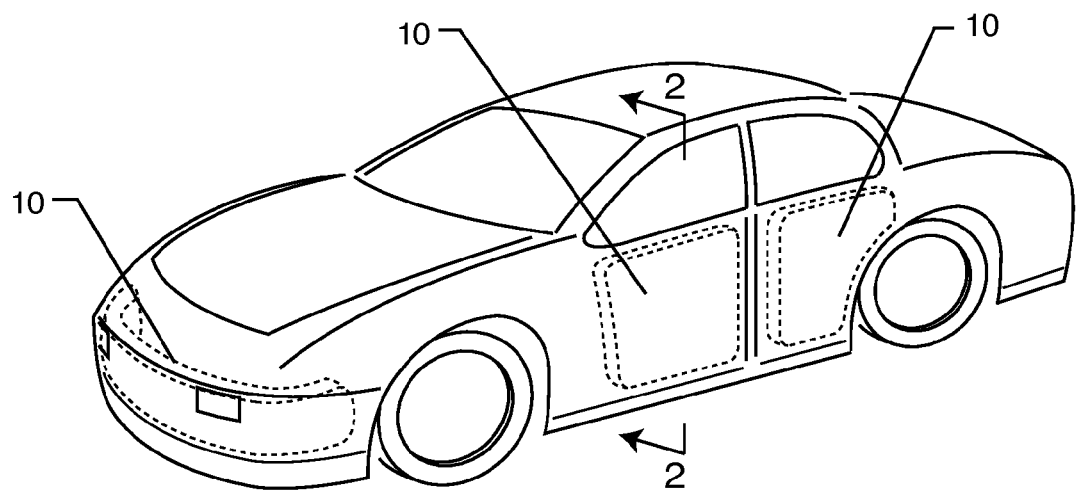
FIG. 1 is a perspective view an exemplary automobile fitted with the automotive energy dissipation device of the present invention.

As shown in the drawings for purposes of illustration, the present invention for an automotive energy dissipation device is referred to generally by the reference number 10. FIG. 1 is a perspective view of several exemplary automotive energy dissipation devices 10 embodying the present invention. As shown here, the energy dissipation device 10 can be located within the body of an automobile in any panel section thereof, preferably located within the front or rear doors, the front or rear bumpers, or any other suitable location within an automobile's structure. FIG. 1 shows the energy dissipation device 10 located within the front bumper and also within the left-side driver door and left-side rear passenger door. It is to be understood that the energy dissipation device 10 can be located within any panel in an automobile and this disclosure doesn't intend to limit it to the precise forms described and shown herein.

Figure 2:
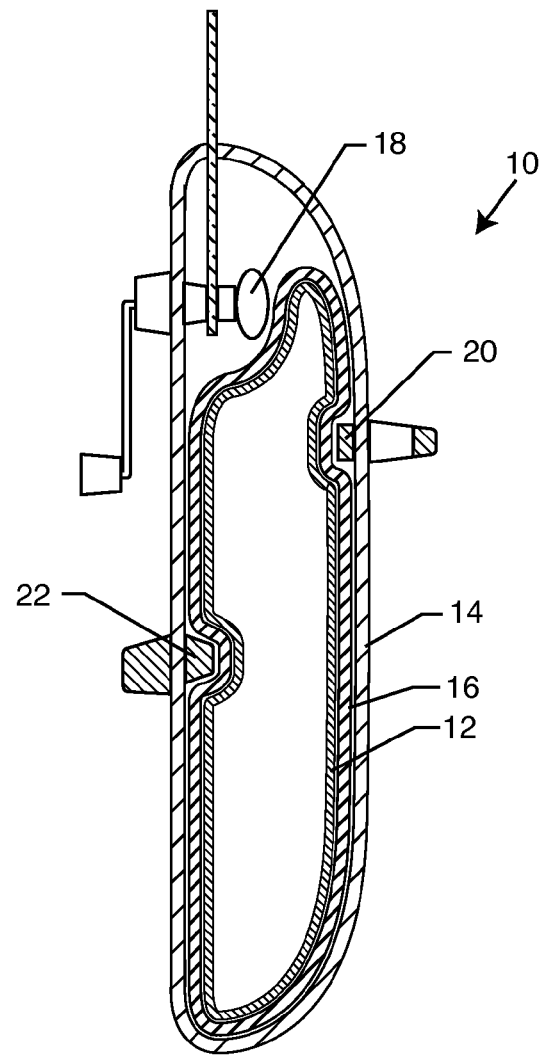
FIG. 2 is an enlarged sectional view taken along line 2-2 of FIG. 1.

FIG. 2 is a sectional view of the structure of FIG. 1 taken along line 2-2. The automotive energy dissipation device 10 includes a bladder 12 disposed adjacent to an interior surface of a body panel 14 of an automobile. A protective liner 16 is disposed between the bladder 12 and the body panel 14. The bladder 12 and protective liner 16 are substantially similarly shaped such that the bladder 12 fits within the protective liner 16. Furthermore, the bladder 12 and protective liner 16 can substantially match the interior contours of the body panel 14. As shown in FIG. 2, the bladder 12 and protective liner 16 are similarly shaped to form around the various obstructions that may be located within a body panel 14. For instance the window mechanism 18, the door handle mechanism 20, and the arm rest mechanism 22 may all create structures that could potentially rip and puncture the bladder 12. The protective liner 16 keeps any such mechanism separated from the bladder 12 and also protects it from a premature rupture during a collision.

The protective liner 16 comprises a resiliently flexible and rupture resistant plastic. During an impact, the protective liner 16 will flex and bend, but not shatter or split. A sharp protrusion could pierce the bladder 12 and render its energy dissipation function obsolete. The protective liner 16 allows the bladder 12 to function as designed and dissipate energy.

The protective liner 16 can be manufactured in a multitude of ways, one of which is the blow molding process. A surrogate body panel can be made such that it resembles an actual body panel 16. The surrogate body panel can then be used as a mold for the blow molding process. This process facilitates creating a variety of differently shaped and sized protective liners.

Figure 3:
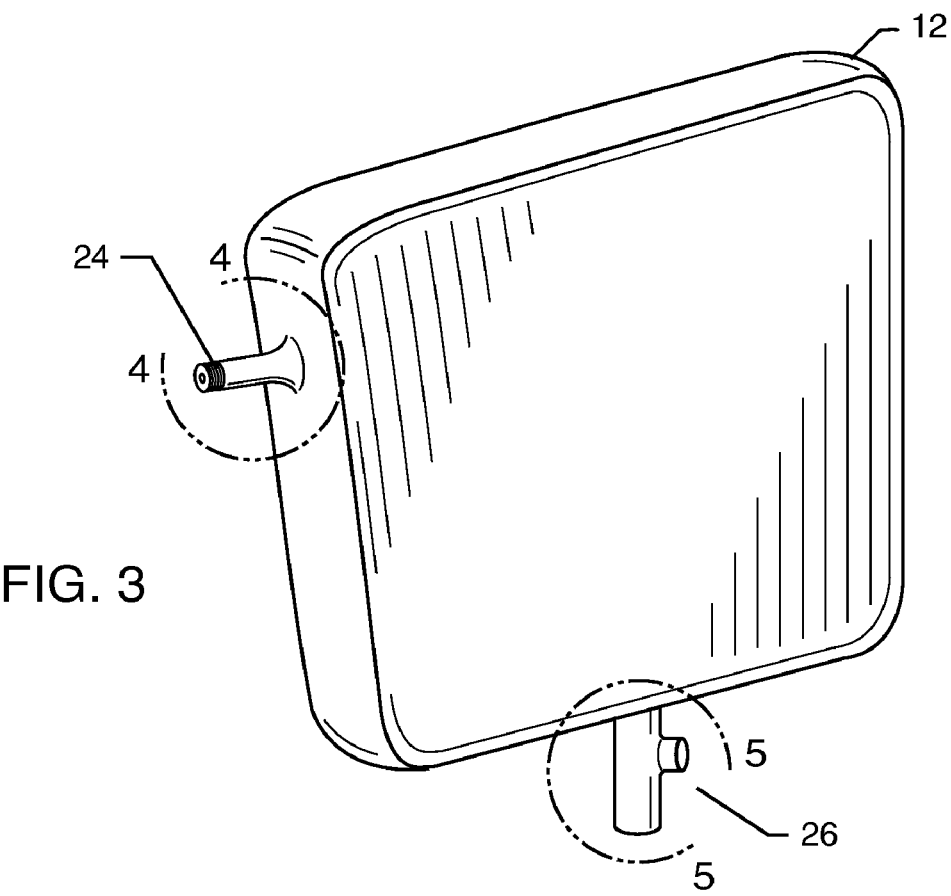
FIG. 3 is a perspective view of a simplified bladder embodying the present invention.
Figure 4:
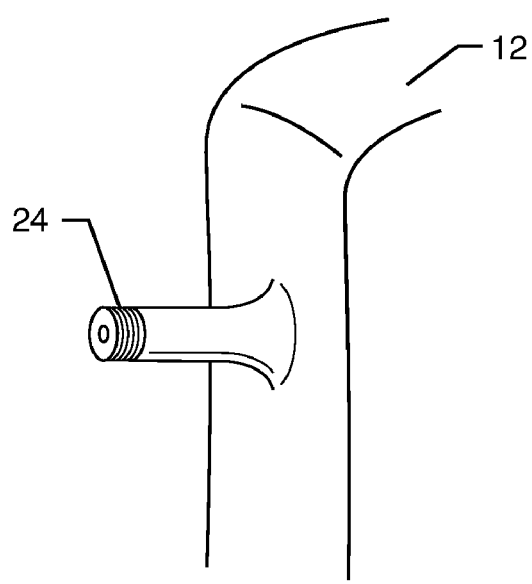
FIG. 4 is an enlarged sectional view taken along line 4-4 from FIG. 3.

FIG. 3 is a perspective view of a simplified bladder 12 embodying the present invention. A valve 24 for inflating the bladder 12 is associated with the bladder 12. FIG. 4 is an enlarged view of FIG. 3 taken along line 4-4 showing the valve 24. The valve 24 may be one valve or a plurality of valves. However, one valve should be sufficient. The valve 24 is used to inflate and pressurize the bladder 12 to a specific pressurization value. The pressure in the bladder 12 will be set above the atmospheric pressure. The valve 24 can be any type of valve sufficient for adding pressurized gas or air into the bladder 12. One such example is that of a typical car tire valve that is commonly used throughout the world. This type of valve is commonly known and can easily be filled with many existing pumps and fittings used today.

The valve 24 will typically protrude through the protective liner 16 such that it can be accessed for inflation and inspection. Also, the location of the valve 24 should be that it is easily accessible. This means that a technician or the automobile's owner can access the valve 24 to check pressure and add more gas or air if necessary. For instance, the valve 24 can be located on the inside sill of a door panel 14 such that it can be accessed when the door is opened.

Figure 5:
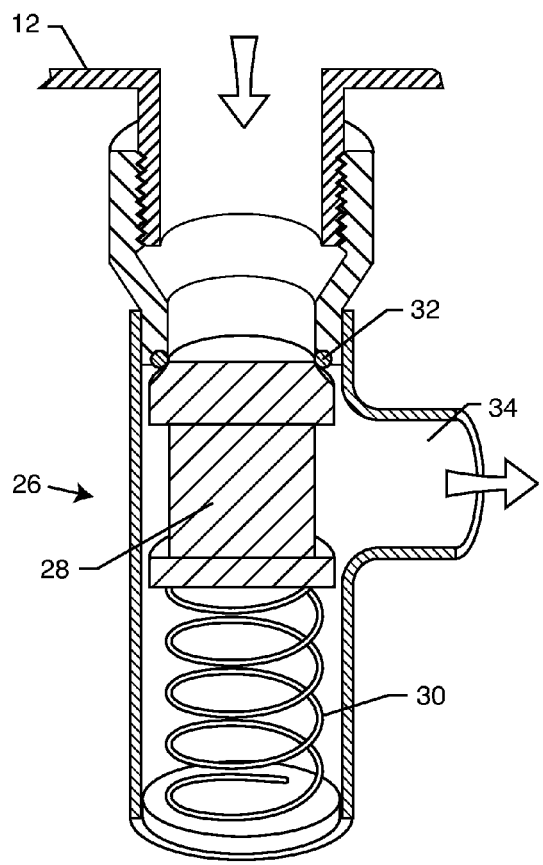
FIG. 5 is an enlarged sectional view taken of the area 5-5 from FIG. 3.

Also shown in FIG. 3 is a pressure relief valve 26. The pressure relief valve 26 is associated with the bladder 12. FIG. 5 is an enlarged view of FIG. 3 taken along line 5-5 showing a simplified example of a pressure relief valve 26. The pressure relief valve 26 may be just one, or a plurality of relief valves. Also, many different types of pressure relief valves may be utilized, and this disclosure is not intended to limit it to the precise form disclosed herein. In this exemplary embodiment, pressurized air contained within the bladder 12 pushes on a piston 28. Normally the pressurized air is contained because the spring 30 creates a higher force as compared to the pressured air and thereby keeps the seal 32 from leaking. The automotive energy dissipation device 10 functions when pressure within the bladder 12 exceeding a preset limit attributable to compression of the bladder 12 during an impact is released through the pressure relief valve 26. The force on the piston 28 due to the over-pressurization is now higher than the force exerted by the spring 30. Air now exits through the nozzle 34. As air exits the pressure relief valve 26 it dissipates energy. This in turn reduces the damage and severity of a crash thereby better protecting the occupants from injury.

Figure 6:
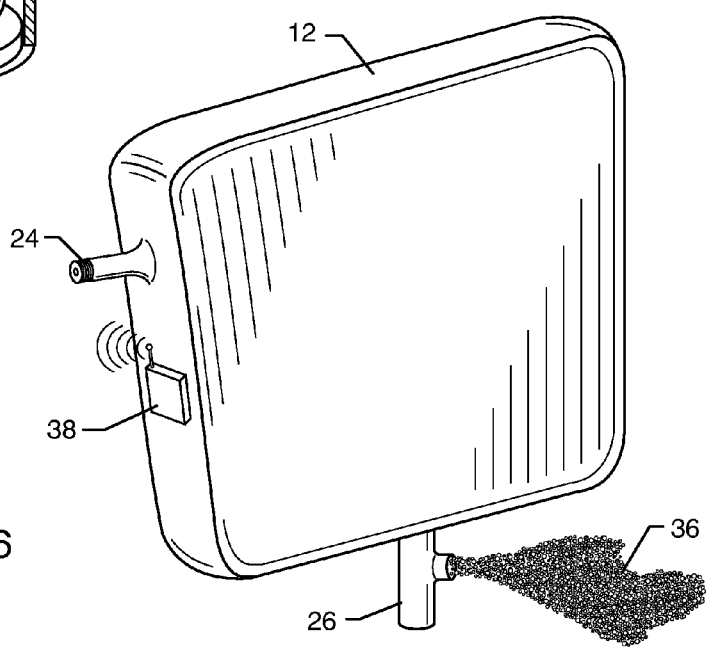
FIG. 6 is a view similar to FIG. 3, but also showing a liquid foam and a pressure sensor.

FIG. 6 is a view similar to FIG. 3 now showing a liquid foam 36 and a pressure sensor 38. In an exemplary embodiment of the automotive energy dissipation device 10, the bladder 12 further contains a fluid foam 36 combined with the pressurized gas or air. The foam 36 can be a multitude of types, wherein one such type is a fire retardant substance. Furthermore, an outlet 34 of the pressure relief valve 26 can be directed to disperse the foam 36 in the general area of a likelihood of a potential fire resulting from a collision. It is desired that the foam 36 component to the pressurized gas or air remain relatively light, so not to add unnecessary weight to the automobile thereby hindering its fuel economy.

In another exemplary embodiment of the automotive energy dissipation device, a pressure sensor 38 is in pressurized communication with the bladder 12. The pressure sensor 38 indicates a low pressure reading to occupants of the automobile through a display and/or noise within the automobile. The pressure sensor 38 could also be a mere visual indicator that must be visually checked. On more complicated vehicles, the pressure sensor 38 can send a radio frequency signal or be wired directly to an electronic display within the automobile.

The bladder 12 can be made from a multitude of materials and manufacturing techniques. For instance, the bladder 12 can comprise a resiliently woven fabric layer and an air impermeable, flexible layer. The fabric may comprise nylon 6-6, as this is the fabric commonly used in airbags today. Alternatively, the bladder 12 can comprise a resiliently woven fabric layer impregnated with an air impermeable material. In either case, the bladder 12 is air impermeable and permanently inflated upon installation such that any substantial air loss from the bladder only occurs during a collision. "Permanently inflated" means that the bladder is inflated once upon installation and remains inflated indefinitely.

Typically the energy dissipation device 10 is intended for use in automobiles; however it could be used in other vehicles such as busses, boats, airplanes, and so forth. The device 10 is designed to dissipate energy during a collision thereby better protecting the occupants from life threatening injuries and death, and accordingly the applications for its successful use are unlimited.

Figure 7:
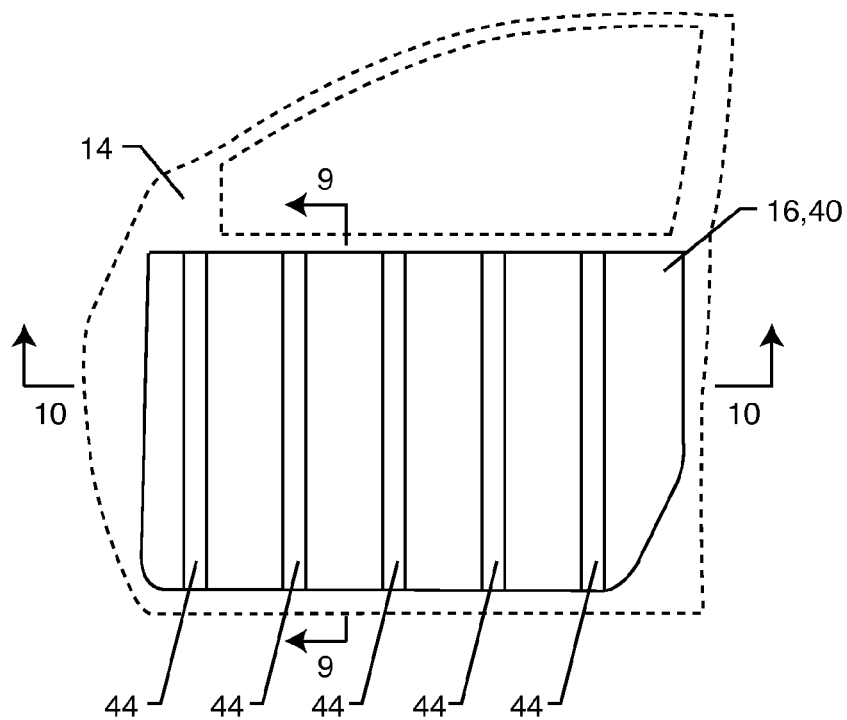
FIG. 7 is a side view of another exemplary embodiment of the present invention viewed from the outside.
Figure 8:
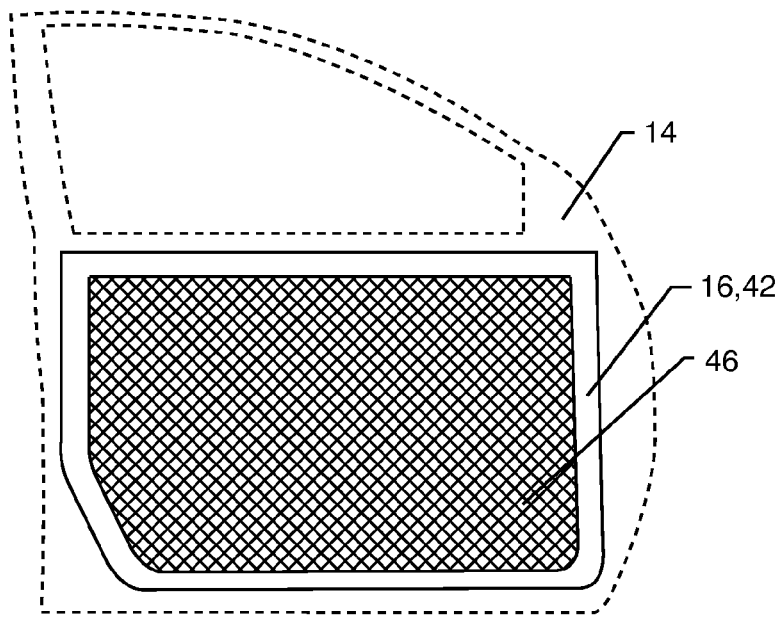
FIG. 8 is another side view of the embodiment of FIG. 7 viewed from the inside.

FIGS. 7-10 are views of another exemplary embodiment of a protective liner 16. FIG. 7 is viewing the protective liner 16 from the outside with the silhouette of the car frame and/or body panel 14 shown in dashed lines. FIG. 8 is a side view of the protective liner 16 of FIG. 7 now viewed from the inside of the vehicle. The protective liner 16 can be manufactured as two sections which are later attached, bonded or simply installed adjacent to each other. For example, FIG. 7 shows an outside portion 40 of the protective liner 16 and FIG. 8 shows the inside portion 42 of the protective liner 16. Each portion 40 and 42 can be separately blow molded and later fused together to form a single structure. Optionally, the two portions 40 and 42 can be fastened together or alternatively, simply installed side-by-side within body panel 14.

In an exemplary embodiment the outer portion 40 can be formed with vertically running channels 44. The channels 44 add structural integrity and stiffness to the outer portion 40. It is to be understood that the channels 44 may be manufactured in other directions, configurations, and sizes as this disclosure is not limited to the precise form described herein. For instance, the channels 44 may run horizontally, vertically, or any combination thereof and may consist of various depths and profiles.

Figure 9:
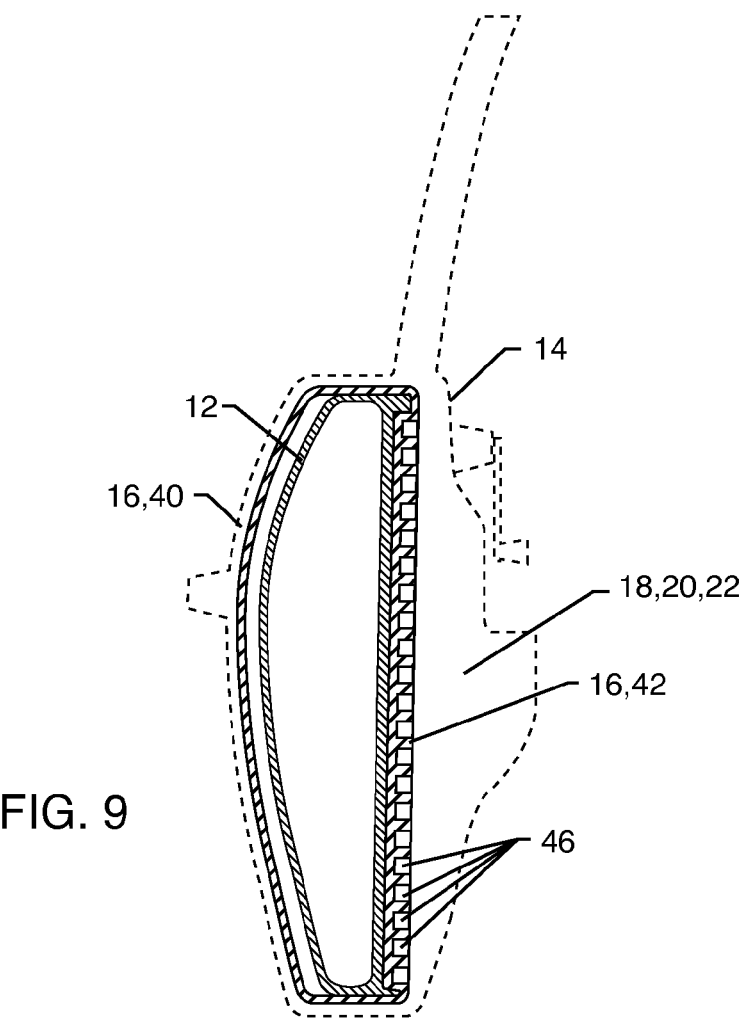
FIG. 9 is a sectional view taken along line 9-9 of FIG. 7.
Figure 10:
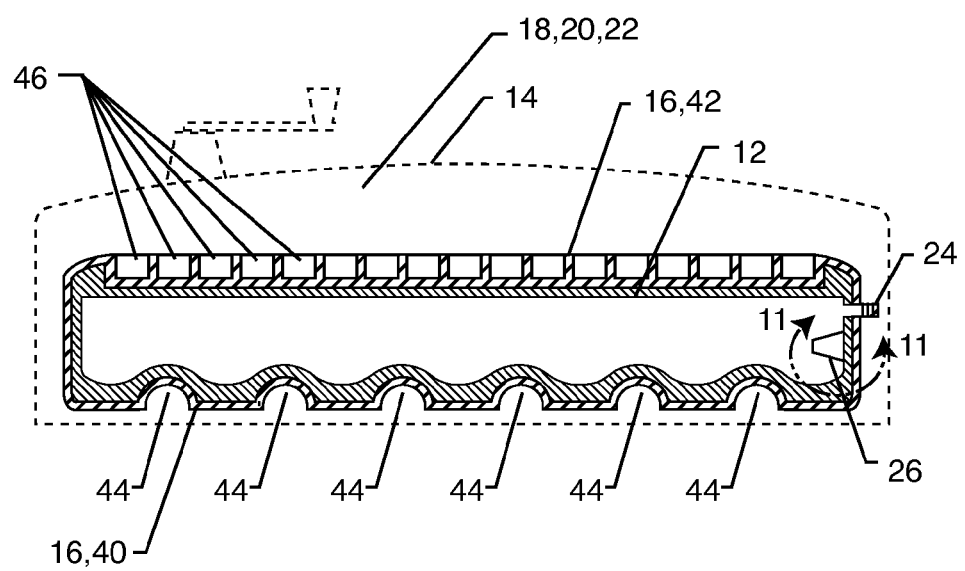
FIG. 10 is a sectional view taken along line 10-10 of FIG. 7.

In an exemplary embodiment the inside portion 42 is formed with an egg crate or mesh pattern 46. This pattern 46 is best shown in FIGS. 8, 9 and 10. The pattern 46 is formed during the blow molding or manufacturing process. The pattern 46 provides additional support for the inside portion 42 of the protective liner 16 when impacting the inside mechanisms of the door. The window mechanism 18, door handle mechanism 20, arm rest mechanism 22, and any other mechanism inside a body panel 14 are potential puncture structures that need to be dampened. The pattern 46 is formed to create a small area of crumple zone that allows sharp mechanisms to impact its surface while not allowing it to penetrate through to the bladder 12 located inside. It is to be understood that many configurations of patterns and shapes 46 may be used to create a barrier zone between the inside mechanisms and the bladder 12, as this disclosure is not intended to limit it to the precise form shown and described herein.

Figure 11:
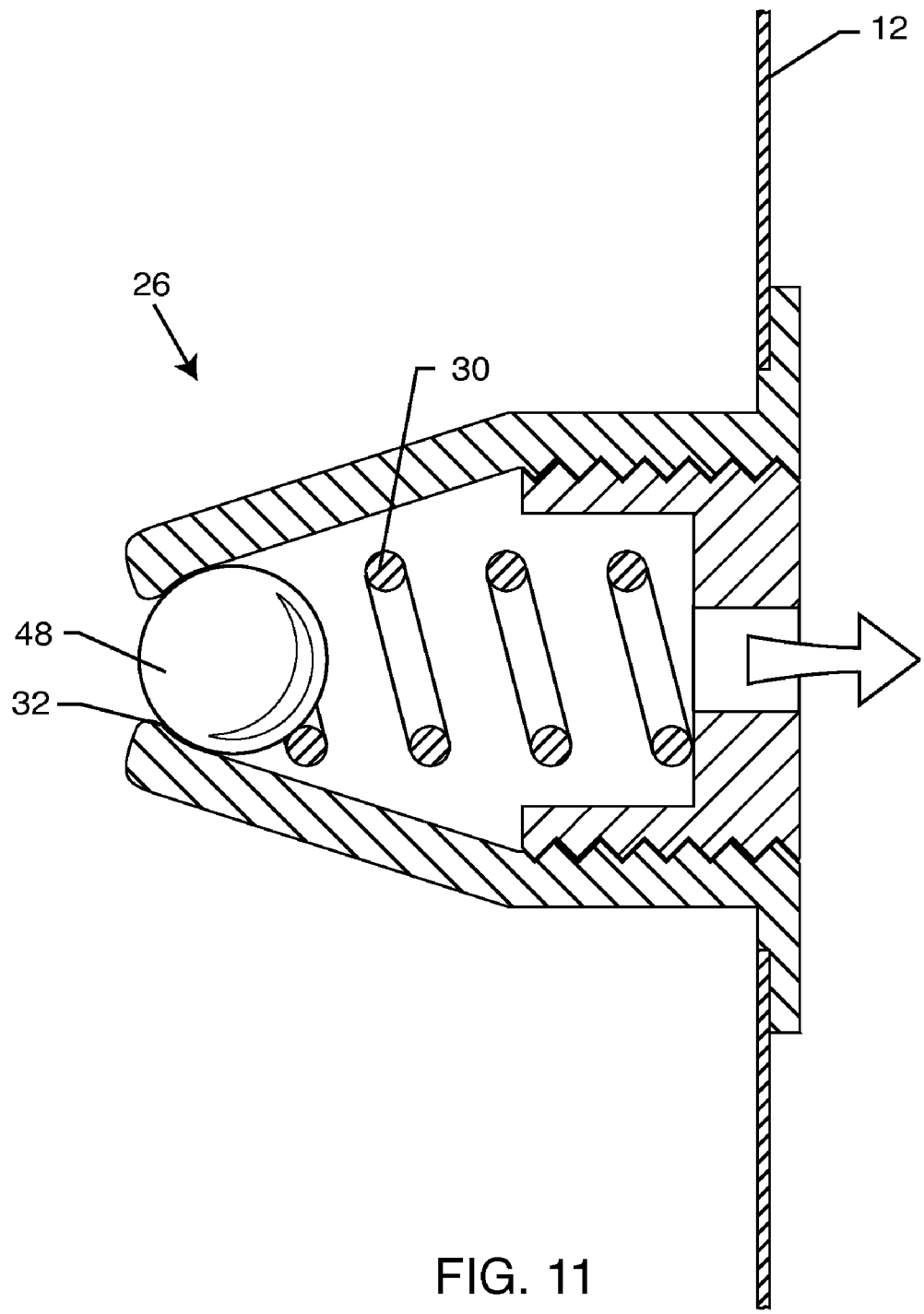
FIG. 11 is a sectional view of an embodiment of a pressure relief valve taken along line 11-11 of FIG. 10.

FIG. 11 is a sectional view of another embodiment of a pressure relief valve 26 taken along line 11-11 of FIG. 10. As compared to FIG. 5, now a ball 48 (before a piston 28) is held in place against a seal 32. As pressure inside the bladder 12 builds during an impact, the gas contained inside can vent outward thereby releasing pressure and dissipating energy.

In another exemplary embodiment the energy dissipating device 10 can be formed into two separate systems when placed within one body panel 14. For instance, the front bumper body panel is a location on an automobile that is rarely impacted directly head on. Most impacts from the front of an automobile are offset collisions where only a portion of the front bumper is impacted. A single energy dissipating device 10 that spans the entire length of the front bumper may have a potential risk of rupture at the opposite end of the impact. For instance, a collision to the left side of the front bumper could force a buildup of pressure in the right side of the bladder 12. The bladder 12 may unwantingly expand and rupture as the protective liner 16 and body panel 14 fail to keep the bladder 12 from expanding. The protective liner 16 is typically designed to push against the bladder 12 as forces are applied to both surfaces 40 and 42, while it is not designed specifically to retain a buildup of pressure without any outside support. For this reason, the energy dissipating device 10 may be best utilized as two separate energy dissipating devices 10 when installed in the front bumper location.

Although several embodiments have been described in detail for purposes of illustration, various modifications may be made to each without departing from the scope and spirit of the invention. Accordingly, the invention is not to be limited, except as by the appended claims.

What is claimed is:

1. An automotive energy dissipation device, comprising:
an impermeable bladder disposed adjacent to an interior surface of a fixed body panel of an automobile;
a protective liner disposed between the impermeable bladder and the body panel;
a valve for permanently inflating the impermeable bladder upon installation; and
a pressure relief valve associated with the impermeable bladder, wherein pressure within the impermeable bladder exceeding a preset limit attributable to compression during an impact is released only through the pressure relief valve thereby dissipating energy.

2. The device of claim 1, wherein the protective liner comprises a resiliently flexible and rupture resistant plastic.

3. The device of claim 2, wherein the protective liner is blow molded.

4. The device of claim 1, wherein the impermeable bladder includes a fluid foam.

5. The device of claim 4, wherein the foam comprises a fire retardant substance.

6. The device of claim 5, wherein an outlet of the pressure relief valve is directed to disperse the foam in the general area of a likelihood of a potential fire resulting from the impact.

7. The device of claim 1, wherein the impermeable bladder and protective liner are substantially similarly shaped.

8. The device of claim 1, including a pressure sensor in communication with the impermeable bladder, wherein the pressure sensor indicates a low pressure reading to occupants of the automobile through a display and/or noise within the automobile.

9. The device of claim 1, wherein the impermeable bladder comprises a resiliently woven fabric layer and an air impermeable flexible layer.

10. The device of claim 9, wherein the fabric comprises nylon 6-6.

11. The device of claim 1, wherein the impermeable bladder comprises a resiliently woven fabric layer impregnated with an air impermeable material.

12. The device of claim 1, wherein the valve for permanently inflating the impermeable bladder upon installation remains accessible for maintenance inflating.

13. An automotive energy dissipation device, comprising:
a bladder disposed adjacent to an interior surface of a fixed body panel of an automobile;
a protective liner disposed between the bladder and the body panel, wherein the protective liner comprises a resiliently flexible and rupture resistant plastic, and wherein the bladder and protective liner are substantially similarly shaped;
a valve for permanently inflating the bladder upon installation; and
a pressure relief valve associated with the bladder, wherein pressure within the bladder exceeding a preset limit attributable to compression during an impact is released only through the pressure relief valve thereby dissipating energy.

14. The device of claim 13, wherein the bladder includes a fluid foam comprising a fire retardant substance, and wherein an outlet of the pressure relief valve is directed to disperse the foam in the general area of a likelihood of a potential fire resulting from the impact.

15. The device of claim 14, further including a pressure sensor in communication with the bladder, wherein the pressure sensor indicates a low pressure reading to occupants of the automobile through a display and/or noise within the automobile.

16. The device of claim 15, wherein the bladder comprises a resiliently woven fabric layer and an air impermeable, flexible layer.

17. The device of claim 15, wherein the bladder comprises a resiliently woven fabric layer impregnated with an air impermeable material.

18. The device of claim 15, wherein the bladder is air impermeable.

19. An automotive energy dissipation device, comprising:
an impermeable bladder disposed adjacent to an interior surface of a fixed body panel of an automobile;
a protective liner disposed between the impermeable bladder and the body panel, wherein the protective liner comprises an outside portion and an inside portion, the outside portion comprising stiffening channels and the inside portion comprising a supporting mesh pattern;
a valve for permanently inflating the impermeable bladder upon installation; and
a pressure relief valve associated with the impermeable bladder, wherein pressure within the impermeable bladder exceeding a preset limit attributable to compression during an impact is released only through the pressure relief valve thereby dissipating energy.

20. The device of claim 19, wherein the outside portion of the protective liner is disposed between the impermeable bladder and an outward facing fixed body panel, and the inside potion of the protective liner is disposed between the impermeable bladder and an inward facing fixed body panel.

* * * * *